United States Patent [19]
Harpman

[11] 3,968,775
[45] July 13, 1976

[54] FUEL SYSTEM FOR INTERNAL COMBUSTION ENGINES
[75] Inventor: Webster B. Harpman, Poland, Ohio
[73] Assignee: Energy Research Inc., Greensburg, Pa.
[22] Filed: Sept. 24, 1973
[21] Appl. No.: 400,413

[52] U.S. Cl. ............... 123/25 B; 123/34 A; 123/122 E; 123/122 F; 123/3
[51] Int. Cl.² ........................................ F02D 19/00
[58] Field of Search ............ 123/25 R, 25 D, 25 E, 123/25 F, 25 P, 3, 121, 122 E, 122 F, 1 A, 34 A, 133, 25 B, 122 B, 122 C, 142.5; 261/142, 145

[56] References Cited
UNITED STATES PATENTS

| 1,060,042 | 4/1913 | Wales .......................... 123/122 F |
| 1,278,946 | 9/1918 | Langworthy ................. 123/121 |
| 2,150,905 | 3/1939 | Belgau ......................... 123/133 |
| 2,747,555 | 5/1956 | Brunner ....................... 123/34 A |
| 3,322,105 | 5/1967 | McIntyre ...................... 123/122 F |
| 3,717,129 | 2/1973 | Fox .............................. 123/121 X |
| 3,792,688 | 2/1974 | Grainger ...................... 123/122 F X |

FOREIGN PATENTS OR APPLICATIONS

| 712,143 | 7/1954 | United Kingdom ............ 123/34 A |
| 327,874 | 4/1930 | United Kingdom ............ 123/25 R |

*Primary Examiner*—Charles J. Myhre
*Assistant Examiner*—Ira S. Lazarus
*Attorney, Agent, or Firm*—Harold A. Williamson, Sr.

[57] ABSTRACT

A fuel system for an internal combustion engine of the piston type vaporizes a liquid fuel and water and mixes the resulting gaseous fuel and water vapor with air in a metering valve which communicates with the internal combustion engine. Heat from a separate source and from the internal combustion engine is used in the vaporization of the fuel and water. The gaseous state of the fuel represents molecules at the greatest degree of separation from each other providing the greatest opportunity for contact of the reacting species in the gaseous condition as chemical reactions occur only between particles at the atomic or molecular level and it is necessary for the reacting species to be in actual contact at the time of reaction. The fuel system therefore enables complete combustion and the elimination of the atmospheric pollutants common in the operation of internal combustion engines.

3 Claims, 1 Drawing Figure

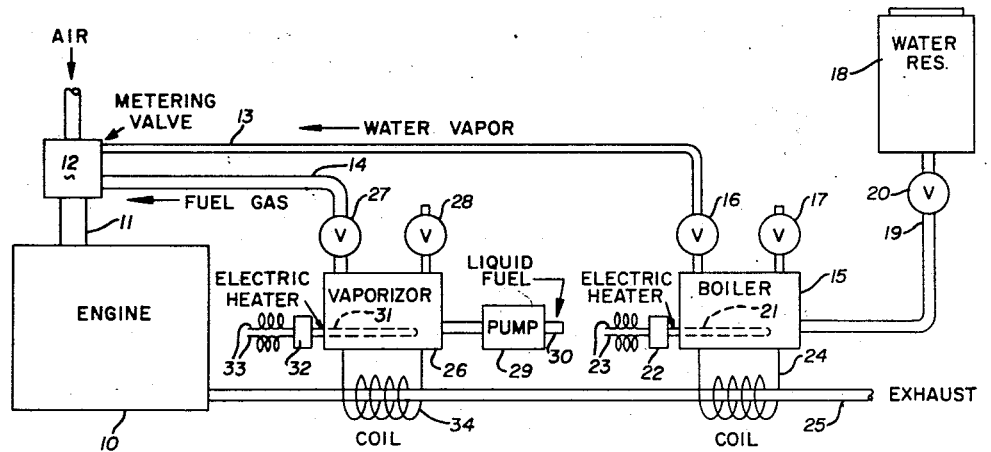

FUEL SYSTEM FOR INTERNAL COMBUSTION ENGINES

BACKGROUND OF THE INVENTION

1. Field of the Invention

This invention relates to fuel systems for internal combustion engines of the piston type.

2. Description of the Prior Art

Fuel systems for internal combustion engines of the piston type have generally comprised carburetors in which liquid fuel is delivered into a stream of air and divided into a series of fine droplets approaching vaporization and immediately conveyed to the point of combustion. Only those molecules at the surface of the fuel droplets are in a position to react with another species and incomplete combustion results because the very short time allowed is insufficient for more than a little vaporization of the fuel to occur. The prior art engines therefore exhaust large quantities of hydrocarbons, carbon monoxide and oxides of nitrogen all of which are undesirable atmospheric pollutants.

This invention vaporizes the liquid fuel so that in its gaseous state it will detonate at a very high rate and adds the water vapor to reduce the high rate of detonation of the fuel to achieve practically complete combustion and desirable reaction time in the internal combustion engine.

SUMMARY OF THE INVENTION

A fuel system for an internal combustion engine of the piston type is disclosed in which liquid fuel such as gasoline is vaporized to produce a gaseous fuel which is delivered under pressure to a metering valve. Simultaneously water is vaporized and water vapor is delivered under pressure to the same metering valve and the primary combustion air is available to the metering valve. The partial vacuum resulting from the operation of the pistons in the internal combustion engines moves the combustion air with the proper quantities of gaseous fuel and water vapor to the points of combustion in the cylinders of the engine. The vaporization of the liquid fuel and the water is caused by heat from an external source initially and from the heat of the internal combustion engine during normal operation after warmup.

DESCRIPTION OF THE DRAWING

The drawing is a diagrammatic illustration of the fuel system for an internal combustion engine.

DESCRIPTION OF THE PREFERRED EMBODIMENT

Figure 1:
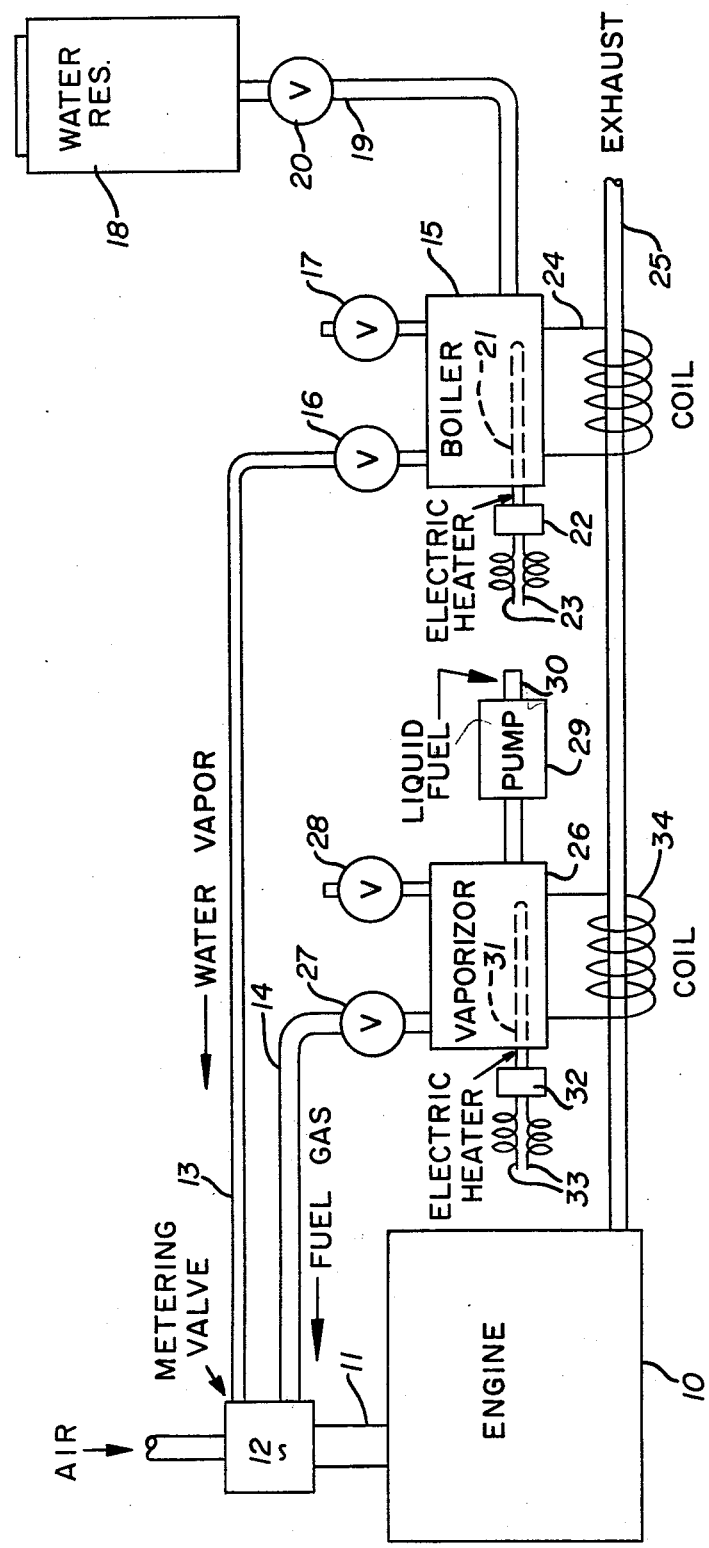

In the form of the invention chosen for illustration and description herein, the fuel system for an internal combustion engine is illustrated in operative communication with an internal combustion engine 10 of the piston type in which the inlet manifold is indicated at 11 in communication with a metering valve 12 to which primary air is available as from an air cleaner, not shown, and into which water vapor is delivered by a tubular conduit 13 and into which vaporized fuel in a gaseous form is delivered by a tubular conduit 14. The water vapor is supplied by a boiler 15 which communicates with the tubular conduit 13 by way of a check valve 16 which is open only in the direction away from the boiler 15. A pressure actuated safety valve 17 communicates with the boiler 15 as does a water reservoir 18 by way of a tubular conduit 19 in which a control valve 20 is located. An emersion heater 21 is positioned in the boiler 15 and includes an electrically energized heating element which is controlled by a thermostat 22 and supplied by conductors 23 from a suitable source of electric energy such as a battery or an alternator.

A steam coil 24 communicates at its opposite ends with the boiler 15 and is positioned around and about a portion of the exhaust system 25 of the internal combustion engine 10. The arrangement is such that a small amount of water is maintained in the boiler 15 by the control valve 20 with the thermostat 22 subject to the temperature of the boiler 15 and arranged so that when the temperature is less than that necessary to produce water vapor the electrical conductors 23 are connected to the heating element in the emersion heater 21 so as to establish the necessary temperature in the boiler 15.

At such time as the steam coil 24 produces steam from the heat of the exhaust system 25 of the internal combustion engine the thermostat 22 which may be and preferably is also subject of pressure actuation and high temperature actuation will disconnect the electrical energy to the emersion heater 21 with the system thereafter operating on the exhaust heat of the engine. The water vapor is supplied at a desired pressure, for example 10 lbs. per square inch to the metering valve 12 by way of the tubular conduit 13.

The gaseous fuel supplied the metering valve 12 is supplied by a vaporizer 26 which is in communication with the metering valve 12 by way of the tubular conduit 14 and a one way check valve 27 open only in the direction away from the vaporizer 26. A pressure actuated safety valve 28 communicates with the vaporizer 26 and liquid fuel is supplied to the vaporizer 26 by a pump 29 in a liquid fuel supply line 30.

The vaporizer 26 is provided with a flat strip heater 31 which includes an electric heating element controlled by a thermostat 32 which acts to connect the electric heater 31 with a power source by way of conductors 33. A vaporizing coil 34 communicates with the vaporizer and is positioned around and about a portion of the exhaust system of the internal combustion engine. The arrangement is such that when the vaporizer is cold and liquid fuel is delivered thereto by the pump 29, the thermostat 32 will energize the electric heater 31 to supply sufficient heat to flash vaporize the liquid fuel, about 700°F. is necessary.

It has been determined that adding a plurality of fins to the electric heater and directing the liquid fuel against the fins by spray nozzles will provide an initial very rapid rate of vaporization. The area of the vaporizer must be sufficient to enclose a volume of gaseous fuel sufficient to operate the internal combustion engine at all times and under a suitable pressure, for example 10 lbs. per square inch as occasioned both by the introduction of liquid fuel into the vaporizer by the pump 29 and the expanding vapor as the fuel turns to a gaseous state. The safety valve 28 is responsive to both pressure and temperature and in addition to venting the vaporizer 26 upon predetermined pressures and temperatures being reached, it is interconnected with the pump 29 and the thermostat 22 so as to shut off the pump 29 at a predetermined over normal pressure and to actuate the thermostat 32 so as to break the connection with the conductors 33 supplying the electrically energized flat strip heater 31.

Those skilled in the art will observe that a desirable ratio between the gaseous fuel and the water vapor delivered the metering valve 21 by the fuel system hereinbefore described, is desirable and it has been determined that the water vapor obtained from one gallon of water uniformly and continuously supplied the metering valve 12 provides a suitable ratio with respect to 80 gallons of gasoline delivered to the vaporizer by the pump 29.

It will further occur to those skilled in the art that an anti-freeze additive such as alcohol can be added to the water in the reservoir 18 without affecting the operation of the device and without changing the water vapor gaseous fuel ratio significantly.

The metering valve may comprise any suitable commercial device which will control the amount of a gaseous fuel admitted into a mixing chamber together with air and one such suitable metering valve is generally available under the trademark CENTURY. In a preferred embodiment the metering valve provides the throttle control with respect to the amount of the gaseous fuel admitted to the inlet manifold 11 of the internal combustion engine, the amount of air being determined by the partial vacuum in the inlet manifold 11 as will be understood by those skilled in the art and the water vapor may be similarly metered by the metering valve 12 or the very small quantity of water vapor required may be simply continuously injected therein.

Tests on an 8 cylinder American Motors engine operating at 1,000 rpm, after warmup, using gasoline of 90 octane rating showed an exhaust containing 200 parts per million hydrocarbons and 4.50 percent carbon monoxide with the factory installed carburetor and after a mechanical tune-up. The same engine modified only in replacing the carburetor with the metering valve as hereinbefore described and using the fuel system as hereinbefore described in connection therewith and operated at 1000 rpm and using the vaporized 90 octane rating fuel and water vapor and after the same degree of warmup, produced an exhaust free of hydrocarbons and only 0.05 percent carbon monoxide.

Those skilled in the art will be aware that decomposition of a fuel molecule may occur without combustion occuring unless there is sufficient time and sufficient oxygen. Such decomposition (pyrolysis) produces products which may be more toxic than the original fuel and the elimination of the possibility of such pyrolysis products in the exhaust may be achieved by insuring as complete combustion as possible with the invention hereinbefore described.

Those skilled in the art will recognize that modifications may be made in the invention disclosed herein and one such modification may be in the form of the gasoline vaporizer 26 wherein the electric heater 31 is moved to the outside lower surface thereof so as to maintain the entire bottom of the vaporizer 26 at a temperature of about 700°F.

A further modification may be made by using a carburetor modified by plugging the liquid fuel jets thereof and introducing the vaporized fuel and water vapor of the present invention into the same along with the primary air so that the carburetor acts only as a throttling valve.

A series of tests with a V8 engine at several different engine speeds are noted on an attached page; a part of this specification by reference.

The test results provide a comparison of the exhaust emissions of the same engine, with gasoline, with and without the fuel system of the invention, with propane and with and without the water vapor.

Test results show hydrocarbons in the exhaust in parts per million and percentages of carbon monoxide present.

Those skilled in the art will recognize that oxides of nitrogen in exhaust emissions vary with the degree of combustion of the fuel and it is therefore believed that the fuel system of this invention reduces such emissions in the same or similar ratio as the reduction of hydrocarbons and carbon monoxide.

Although but one embodiment of the present invention has been illustrated and described, it will be apparent to those skilled in the art that various changes and modifications may be made therein without departing from the spirit of the invention.

TESTS ON A V8 ENGINE WITH AND WITHOUT IMPROVED FUEL SYSTEM INVENTION
HYDROCARBONS (Parts Per Million)

| R.P.M. | With Carburetor and Gasoline | With Carburetor, Gasoline & Water Vapor | With Metering Valve and Propane only | With Metering Valve, Propane & Water Vapor | With Metering Valve & Gasoline Vapor only | With Metering valve, Gasoline vapor & Water vapor |
|---|---|---|---|---|---|---|
| 750 | 260–280 | 200–220 | 45–55 | 0 | 25–30 | 0 |
| 1000 | 190–200 | 150–160 | 35–45 | 0 | 20–25 | 0 |
| 2500 | 50–60 | 45–50 | 35–45 | 0 | 10–15 | 0 |

CARBON MONOXIDE (percent)

| 750 | 6.5–7.0 | 5.8–6.0 | .10–.20 | 0 | .20–.25 | .10–.15 |
| 1000 | 4.5–5.0 | 3.2–3.5 | .10–.20 | 0 | .20–.25 | .05–.10 |
| 2500 | 0.5–0.7 | 0.5–0.7 | .10–.20 | 0 | .10–.15 | 0 |

Having thus described my invention, what I claim is:

1. An improved fuel system for an internal combustion engine having an inlet manifold and comprising a metering valve in communication with said inlet manifold for controlling air and gaseous fuel entering the same and introducing said air and gaseous fuel into said inlet manifold, a water vaporizer and a supply of water therefor and a liquid fuel vaporizer and a supply of liquid fuel therefor, an unbroken flat heating surface in said liquid fuel vaporizer for flash generation of said gaseous fuel, an electric resistance heating unit in said flat heating surface operating at a temperature of at least 700°F. and means for introducing said liquid fuel into said fuel vaporizer and directing the same against said flat heating surface for said flash vaporization thereon, means establishing communication between said liquid fuel vaporizer and said metering valve and between said water vaporizer and said metering valve, valve means in said means establishing communication between said liquid fuel vaporizer and said metering valve arranged to permit said gaseous fuel to flow only from said liquid fuel vaporizer to said metering valve and means for controlling the amount of liquid fuel introduced into said fuel vaporizer responsive in operation to the pressure of gaseous fuel generated in said liquid fuel vaporizer.

2. The fuel system of claim 1 and wherein the liquid fuel vaporizer is a pressure vessel.

3. An improved fuel system for an internal combustion engine having an inlet manifold and comprising a metering valve in communication with said inlet manifold for controlling air and gaseous fuel entering the same and introducing said air and gaseous fuel into said manifold, a liquid fuel vaporizer and a supply of liquid fuel therefor, an unbroken flat heating surface in said liquid fuel vaporizer for flash generation of said gaseous fuel and means establishing communication between said liquid fuel vaporizer and said metering valve, a one way valve in said means establishing communication between said liquid fuel vaporizer and said metering valve, said one way valve normally open toward said metering valve, means for controlling the amount of liquid fuel introduced into said liquid fuel vaporizer responsive in operation to the pressure of gaseous fuel in said liquid fuel vaporizer, means in said flat heating surface operating at a temperature of at least 700°F. and means for delivering said liquid fuel to said flat heating surface for said flash vaporization thereon.

\* \* \* \* \*